(12) United States Patent
Milner

(10) Patent No.: US 11,527,180 B2
(45) Date of Patent: Dec. 13, 2022

(54) ELECTRONIC SIGNAGE ASSEMBLY

(71) Applicant: Rick Milner, Atlanta, GA (US)

(72) Inventor: Rick Milner, Atlanta, GA (US)

(*) Notice: Subject to any disclaimer, the term of this patent is extended or adjusted under 35 U.S.C. 154(b) by 79 days.

(21) Appl. No.: 17/210,587

(22) Filed: Mar. 24, 2021

(65) Prior Publication Data

US 2022/0309965 A1  Sep. 29, 2022

(51) Int. Cl.
*B60Q 1/50* (2006.01)
*G09F 13/00* (2006.01)

(52) U.S. Cl.
CPC .......... *G09F 13/005* (2013.01); *B60Q 1/503* (2013.01)

(58) Field of Classification Search
CPC .......... B60Q 1/503; B60Q 1/50; B60Q 1/302; B60Q 2900/30; F21V 23/0435
See application file for complete search history.

(56) References Cited

U.S. PATENT DOCUMENTS

| | | | |
|---|---|---|---|
| 4,361,828 A | 11/1982 | Hose | |
| 4,974,354 A | 12/1990 | Hembrook | |
| 5,005,306 A | 4/1991 | Kinstler | |
| 5,825,281 A | 10/1998 | McCreary | |
| 5,905,434 A * | 5/1999 | Steffan | B60Q 1/50 116/28 R |
| 6,195,000 B1 | 2/2001 | Smith | |
| 6,304,174 B1 * | 10/2001 | Smith | B60Q 1/50 340/471 |
| 6,553,285 B1 * | 4/2003 | Bahmad | B60Q 1/50 701/1 |
| 7,477,140 B1 * | 1/2009 | Booth | B60Q 1/302 345/82 |
| 7,659,808 B1 * | 2/2010 | Cooper | B60Q 1/503 340/471 |
| 7,952,489 B1 * | 5/2011 | Paterno | B60Q 1/503 340/815.4 |
| 2005/0134441 A1 * | 6/2005 | Somuah | B60Q 1/535 340/435 |
| 2009/0066500 A1 * | 3/2009 | Yu | B60Q 1/52 340/479 |
| 2009/0134984 A1 * | 5/2009 | Chen | B60Q 1/50 340/425.5 |
| 2014/0005860 A1 * | 1/2014 | Chance | B60Q 1/2615 701/2 |
| 2017/0355303 A1 * | 12/2017 | Reyes | B60Q 1/50 |
| 2018/0037156 A1 * | 2/2018 | Stevens | G09F 13/00 |
| 2018/0208107 A1 * | 7/2018 | Melton | B60Q 1/268 |
| 2019/0210616 A1 * | 7/2019 | Watkins | G06V 20/58 |
| 2019/0212967 A1 * | 7/2019 | Stanley | B60Q 1/503 |
| 2019/0381933 A1 * | 12/2019 | Claybrooks | G01S 17/04 |
| 2020/0282895 A1 * | 9/2020 | Yi | B60Q 1/50 |

FOREIGN PATENT DOCUMENTS

| | | | | |
|---|---|---|---|---|
| CH | WO 2007/076618 | * | 7/2007 | ............... B60Q 1/50 |
| IL | WO 2017/103920 | * | 6/2017 | ....... G08G 1/096791 |

* cited by examiner

*Primary Examiner* — Zheng Song

(57) ABSTRACT

An electronic signage assembly for creating and wirelessly posting messages to a display unit includes a display unit comprising a display transceiver and a control unit comprising a remote transceiver, so that the control unit is positioned for wireless communication with the display unit. The display unit also comprises a display screen. The control unit comprises an entry module, which allows for entry of a message. The remote transceiver is positioned to communicate the message, via the display transceiver, to the display screen for display of the message to persons proximate to the display unit.

9 Claims, 5 Drawing Sheets

ELECTRONIC SIGNAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to signage assemblies and more particularly pertains to a new signage assembly for creating and wirelessly posting messages to a display unit. The present invention discloses a signage assembly comprising a display module and a control unit, wherein a message is visible on the control unit prior to sending the message for display by the display module.

(2) Description of Related Art Including Information Disclosed Under 37 CFR 1.97 and 1.98

The prior art relates to signage assemblies. Prior art signage assemblies may comprise display modules for vehicles configured for selectively displaying one of a set of messages or a graphic design, which may be controlled remotely, and which may be operationally engaged to brake systems of the vehicles. What is lacking in the prior art is a signage assembly comprising a display module and a control unit, wherein a message is visible on the control unit prior to sending the message for display by the display module.

BRIEF SUMMARY OF THE INVENTION

An embodiment of the disclosure meets the needs presented above by generally comprising a display unit comprising a display transceiver and a control unit comprising a remote transceiver, so that the control unit is positioned for wireless communication with the display unit. The display unit also comprises a display screen. The control unit comprises an entry module configured for entry of a message, positioning the remote transceiver to communicate the message, via the display transceiver, to the display screen. The display screen is configured to display the message to persons proximate to the display unit.

The control unit comprises one or more of a dedicated controller, which is paired exclusively with the display unit, and programming code, which is selectively positionable on an electronic device and enables the electronic device to emulate control functions of the control unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
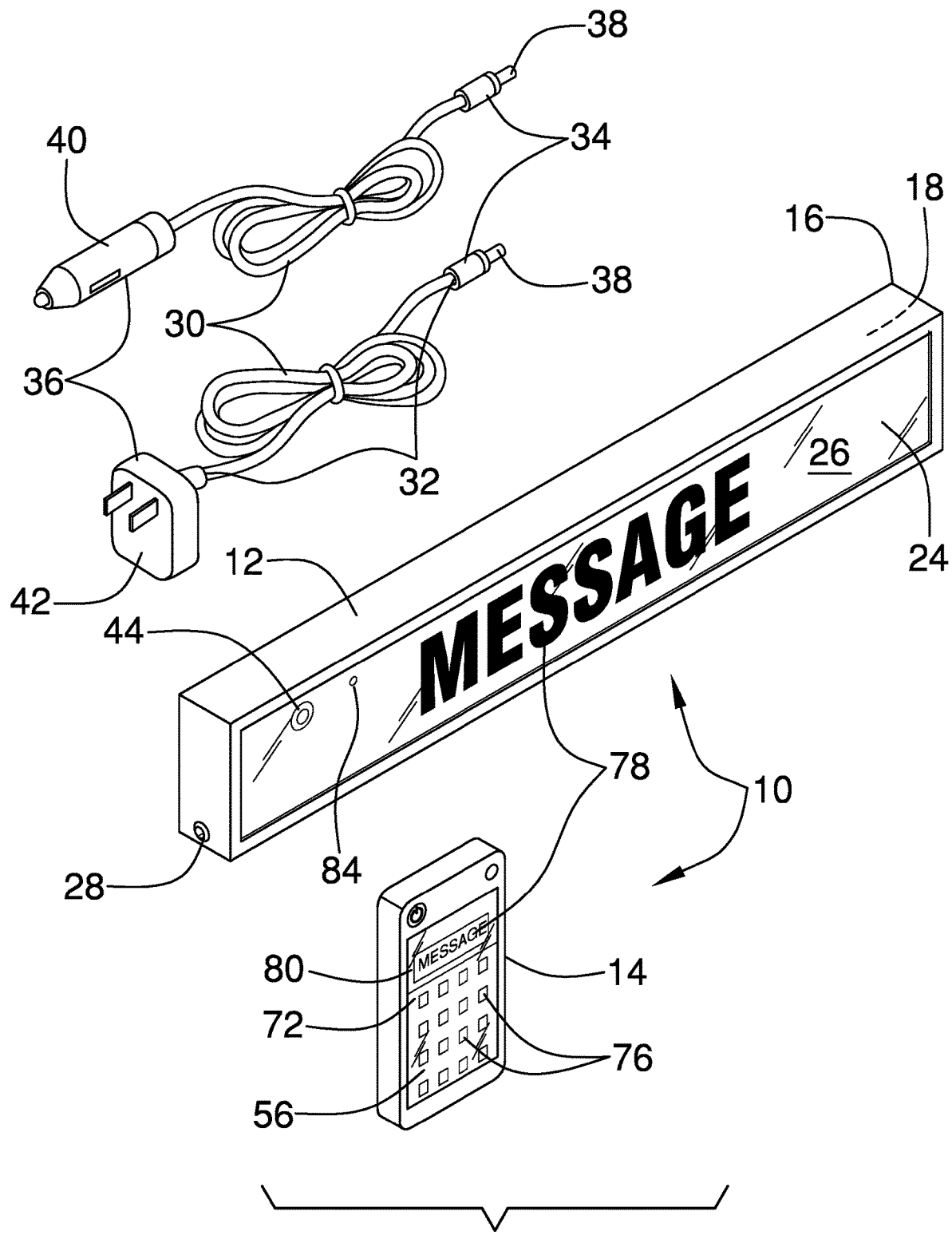
FIG. 1 is a front isometric perspective view of an electronic signage assembly according to an embodiment of the disclosure.
Figure 2:
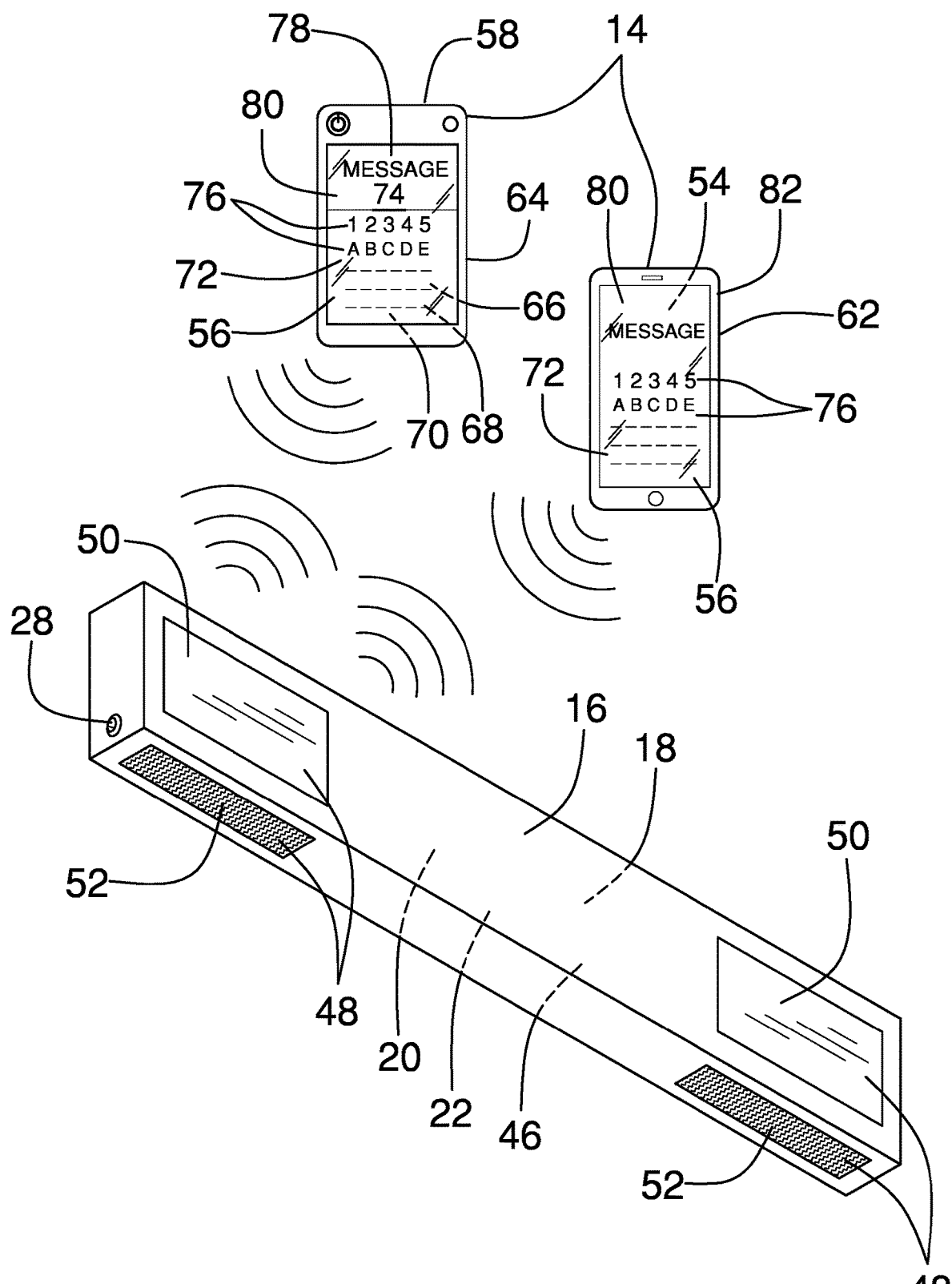
FIG. 2 is a bottom isometric perspective view of an embodiment of the disclosure.

With reference now to the drawings, and in particular to FIGS. 1 through 5 thereof, a new signage assembly embodying the principles and concepts of an embodiment of the disclosure and generally designated by the reference numeral 10 will be described.

As best illustrated in FIGS. 1 through 5, the electronic signage assembly 10 generally comprises a display unit 12 and a control unit 14. The display unit 12 comprises a display housing 16, which defines an interior space 18. A display microprocessor 20 and a display transceiver 22 are engaged to the display housing 16 and are positioned in the interior space 18. A display screen 24 is engaged to a first face 26 of the display housing 16. The display microprocessor 20 is operationally engaged to the display transceiver 22 and the display screen 24.

Figure 3:
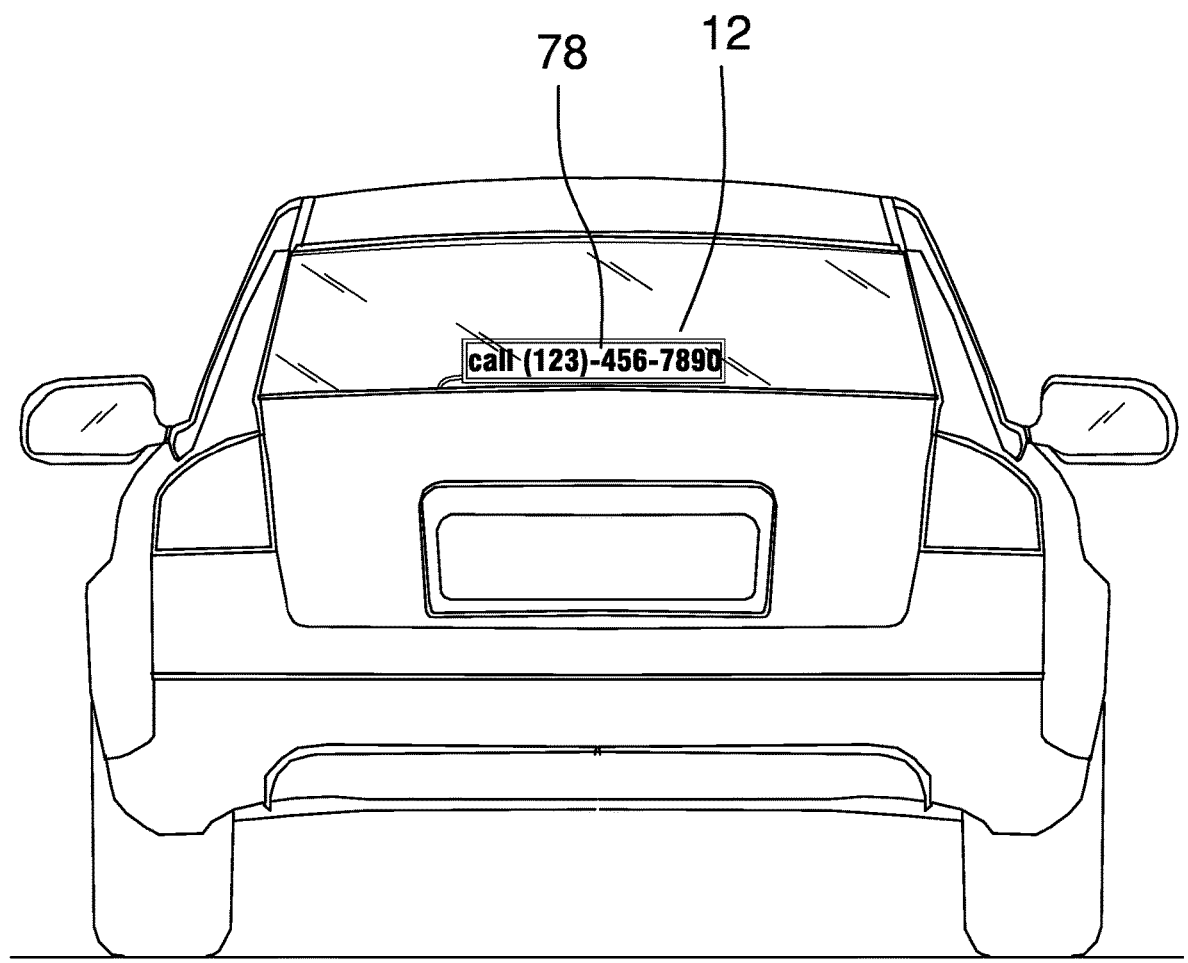
FIG. 3 is an in-use view of an embodiment of the disclosure.
Figure 5:
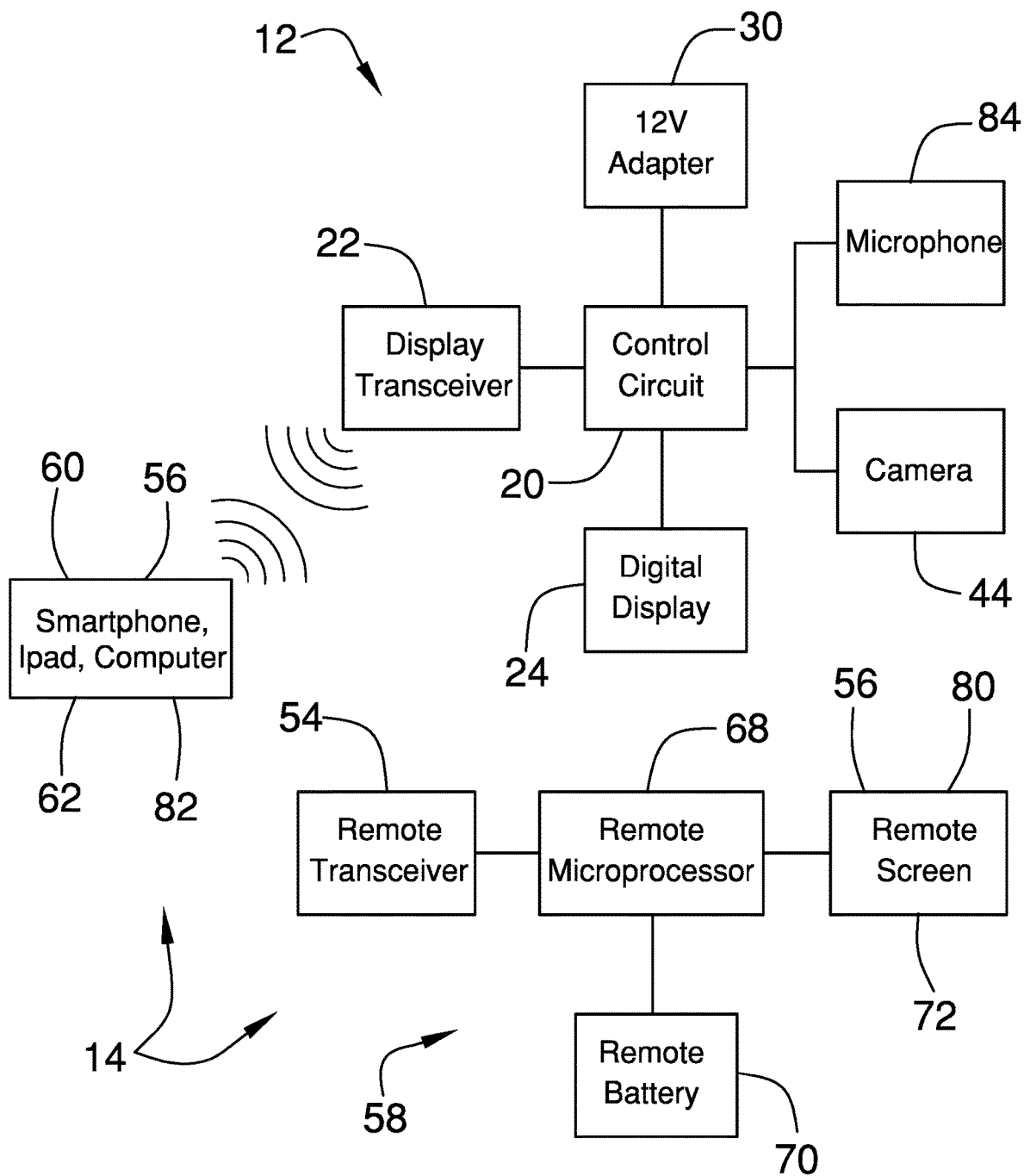
FIG. 5 is a block diagram of an embodiment of the disclosure.

The display housing 16 may be rectangular box shaped, as shown in FIG. 1, which allows it to be mounted to a variety of substrates, such as an automobile, as shown in FIG. 3, or above a door of a structure, as shown in FIG. 5.

A port 28 is engaged to the display housing 16 and is operationally engaged to the display microprocessor 20. The assembly 10 also comprises a cord 30, which has opposed ends 32, to which are engaged singly a first plug 34 and a second plug 36. The first plug 34 is complementary to the port 28 so that the port 28 is positioned for insertion of the first plug 34. The second plug 36 is configured to engage a source of electrical current. The cord 30 thus is configured to operationally engage the display microprocessor 20 to the source of electrical current to power the display microprocessor 20.

The first plug 34 may comprise a cylindrical plug 38, or other connecting means, such as, but not limited to, Universal Serial Bus plugs, Ingress Protection Code 44 connectors, and the like. The second plug 36 may comprise a cigarette lighter adapter 40 or an alternating current power plug 42, as shown in FIG. 1, or other connecting means, such as, but not limited to, Universal Serial Bus plugs, and the like.

The present invention also anticipates a display battery (not shown), which is engaged to the display housing 16, positioned in the interior space 18, and operationally engaged to the display microprocessor 20. The display battery would allow the display unit 12 to operate without a direct connection to the source of electrical current.

The present invention also anticipates a camera 44 and a data storage module 46 engaged to the display housing 16 and operationally engaged to the display microprocessor 20. The camera 44 is configured to capture a video image of an area proximate to the display housing 16 and is positioned to relay the video image to the display microprocessor 20, which is configured to store the video image. The camera 44 and the data storage module 46 allow the display unit 12 to fulfill a security function. The present invention also anticipates a microphone 84 engaged to the display housing 16 and operationally engaged to the display microprocessor 20, which could be used in jurisdictions where recording is legal.

Figure 4:
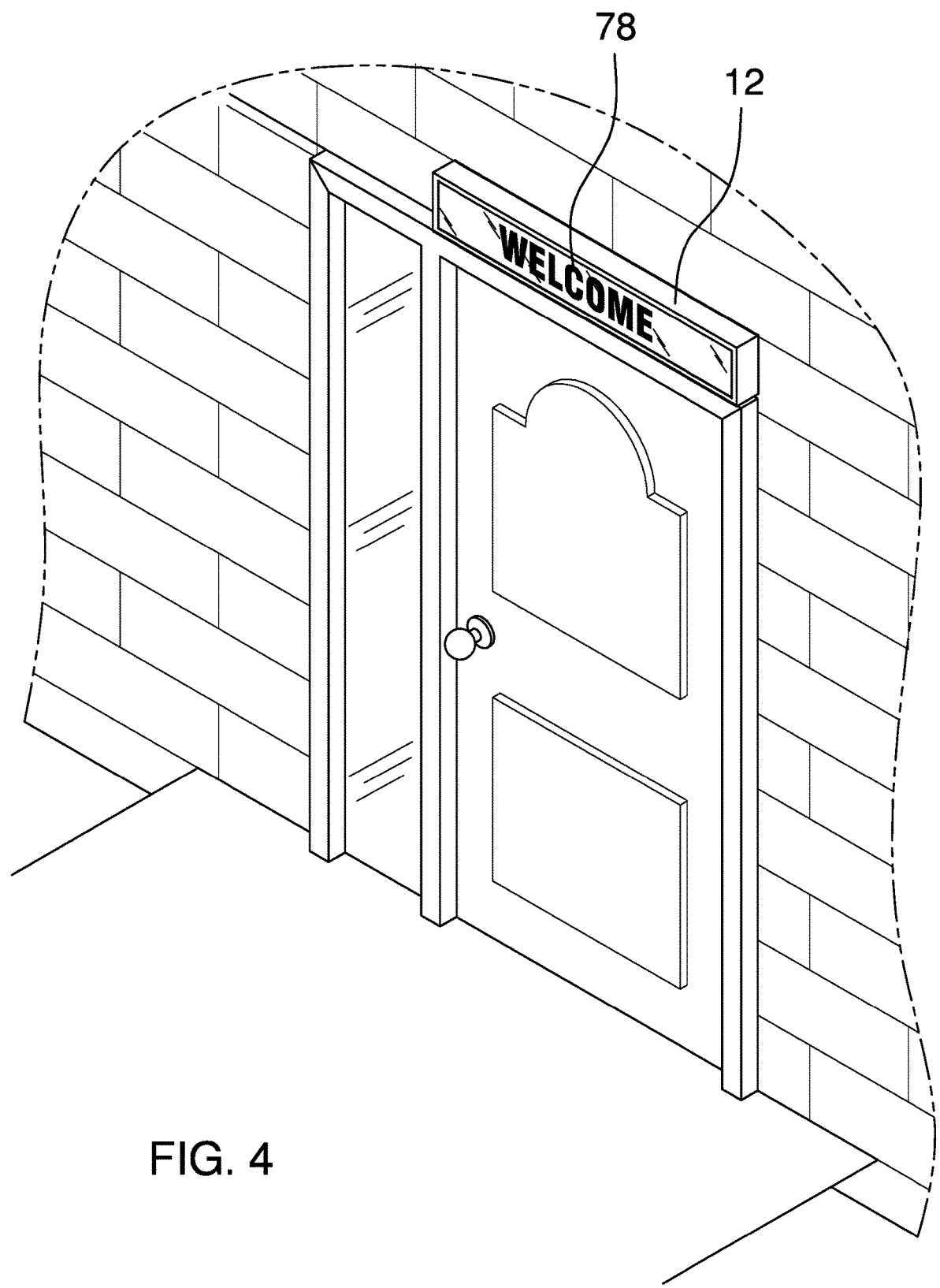
FIG. 4 is an in-use view of an embodiment of the disclosure.

A fastener 48 engaged to the display housing 16 is configured to engage a substrate, such as the car shown in FIG. 3 or the structure shown in FIG. 4, so that the display housing 16 is mounted to the substrate. The fastener 48 comprises one or more of a magnet 50 and a hook and loop fastener 52.

The control unit 14 comprises a remote transceiver 54, so that the control unit 14 is positioned for wireless communication with the display unit 12. The control unit 14 also comprises an entry module 56 configured for entry of a message 78, positioning the remote transceiver 54 to communicate the message 78, via the display transceiver 22, to the display screen 24. The display screen 24 is configured to display the message 78 to persons proximate to the display unit 12.

The control unit 14 comprises one or more of a dedicated controller 58, paired exclusively with the display unit 12, and programming code 60 selectively positionable on an electronic device 62 and enabling the electronic device 62 to emulate control functions of the control unit 14. For example, the dedicated controller 58 may comprise a remote housing 64 defining an internal space 66. A remote microprocessor 68, a remote battery 70, and the remote transceiver 54 are engaged to the remote housing 64 and are positioned in the internal space 66. The entry module 56 comprises a remote screen 72, which is engaged to a first surface 74 of the remote housing 64. The remote battery 70 is operationally engaged to the remote microprocessor 68 for powering the remote microprocessor 68. The remote microprocessor 68 is operationally engaged to the remote transceiver 54 and the remote screen 72.

The remote screen 72 is touch enabled and configured to present alphanumeric characters 76. The remote screen 72 thus is configured for entry of the message 78 by selective touching of respective alphanumeric characters 76. The remote screen 72 also is configured to present the message 78, on a portion 80 of the remote screen 72, prior to the remote transceiver 54 communicating the message 78, via the display transceiver 22, to the display screen 24. The remote housing 64 may be rectangular box shaped, as shown in FIG. 1, so that it can be readily grasped in a hand of a user.

Additionally, the programming code 60 may be positioned on the electronic device 62, such as a smart phone 82 or a computer, which comprise the remote screen 72 and the remote transceiver 54. The programming code 60 enables the electronic device 62 for entry of the message 78 by selective touching of respective alphanumeric characters 76 displayed on the remote screen 72. The remote screen 72 of the electronic device 62 is configured to present the message 78, on the portion 80 of the remote screen 72, prior to the remote transceiver 54 communicating the message 78 to the display unit 12.

In use, the display unit 12 is positioned as required for display of a desired message 78. For example, the display unit 12 could be fastened to a rear of the car, as shown in FIG. 3, using the magnet 50, in a situation in which the user wishes to display a distress message 78, or perhaps as an advertising message 78. Alternatively, the display unit 12 could be fastened above a door, as shown in FIG. 4, using the hook and loop fastener 52, in a situation in which the user wishes to display a welcome message 78. The dedicated controller 58 then is used to compose the message 78 and to send the message 78 to the display unit 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic signage assembly comprising:
   a display unit comprising a display screen and a display transceiver;
   a control unit comprising an entry module and a remote transceiver, such that the control unit is positioned for wireless communication with the display unit, the entry module being configured for entering of a message, positioning the remote transceiver for communicating the message, via the display transceiver, to the display screen, wherein the display screen is configured for displaying the message to persons proximate to the display unit; and
   wherein the display unit comprises:
   a display housing defining an interior space, the display transceiver being engaged to the display housing and positioned in the interior space, the display screen being engaged to a first face of the display housing;

a display microprocessor engaged to the display housing and positioned in the interior space, the display microprocessor being operationally engaged to the display transceiver and the display screen;

a port engaged to the display housing and being operationally engaged to the display microprocessor;

a cord having opposed ends; and a first plug and a second plug engaged singly to the opposed ends of the cord, the first plug being complementary to the port, such that the port is positioned for insertion of the first plug, the second plug being configured for engaging a source of electrical current, wherein the cord is configured for operationally engaging the display microprocessor to the source of electrical current for powering the display microprocessor.

2. The electronic signage assembly of claim 1, further including:

a camera engaged to the display housing and being operationally engaged to the display microprocessor, the camera being configured for capturing a video image of an area proximate to the display housing and positioned for relaying the video image to the display microprocessor; and a data storage module engaged to the display housing and being operationally engaged to the display microprocessor, wherein the data storage module is configured for storing the video image.

3. The electronic signage assembly of claim 2, further including a fastener engaged to the display housing and being configured for engaging a substrate, such that the display housing is mounted to the substrate.

4. The electronic signage assembly of claim 2, wherein the fastener comprises one or more of a magnet and a hook and loop fastener.

5. The electronic signage assembly of claim 2, wherein the display housing is rectangular box shaped.

6. The electronic signage assembly of claim 1, wherein the control unit comprises one or more of a dedicated controller, paired exclusively with the display unit, and programming code selectively positionable on an electronic device and enabling the electronic device for emulating control functions of the control unit.

7. An electronic signage assembly comprising:

a display unit comprising a display screen and a display transceiver;

a control unit comprising an entry module and a remote transceiver, such that the control unit is positioned for wireless communication with the display unit, the entry module being configured for entering of a message, positioning the remote transceiver for communicating the message, via the display transceiver, to the display screen, wherein the display screen is configured for displaying the message to persons proximate to the display unit, wherein the control unit comprises one or more of a dedicated controller, paired exclusively with the display unit, and programming code selectively positionable on an electronic device and enabling the electronic device for emulating control functions of the control unit; and wherein the dedicated controller comprises:

a remote housing defining an internal space, the remote transceiver being engaged to the remote housing and positioned in the internal space, the entry module comprising a remote screen engaged to a first surface of the remote housing, the remote screen being touch enabled and configured for presenting alphanumeric characters, wherein the remote screen is configured for entry of the message by selective touching of respective alphanumeric characters, and wherein the remote screen is configured for presenting the message, on a portion of the remote screen, prior to the remote transceiver communicating the message, via the display transceiver, to the display screen;

a remote microprocessor engaged to the remote housing and positioned in the internal space, the remote microprocessor being operationally engaged to the remote transceiver and the remote screen; and a remote battery engaged to the remote housing and positioned in the internal space, the remote battery being operationally engaged to the remote microprocessor for powering the remote microprocessor.

8. The electronic signage assembly of claim 7, wherein the remote housing is rectangular box shaped.

9. An electronic signage assembly comprising:

a display unit comprising a display screen and a display transceiver, the display unit comprising:

a display housing defining an interior space, the display transceiver being engaged to the display housing and positioned in the interior space, the display screen being engaged to a first face of the display housing, the display housing being rectangular box shaped;

a display microprocessor engaged to the display housing and positioned in the interior space, the display microprocessor being operationally engaged to the display transceiver and the display screen, a port engaged to the display housing and being operationally engaged to the display microprocessor, a cord having opposed ends, a first plug and a second plug engaged singly to the opposed ends of the cord, the first plug being complementary to the port, such that the port is positioned for insertion of the first plug, the second plug being configured for engaging a source of electrical current, wherein the cord is configured for operationally engaging the display microprocessor to the source of electrical current for powering the display microprocessor, a camera engaged to the display housing and being operationally engaged to the display microprocessor, the camera being configured for capturing a video image of an area proximate to the display housing and positioned for relaying the video image to the display microprocessor, a data storage module engaged to the display housing and being operationally engaged to the display microprocessor, wherein the data storage module is configured for storing the video image, and a fastener engaged to the display housing and being configured for engaging a substrate, such that the display housing is mounted to the substrate, the fastener comprising one or more of a magnet and a hook and loop fastener; and a control unit comprising an entry module and a remote transceiver, such that the control unit is positioned for wireless communication with the display unit, the entry module being configured for entering of a message, positioning the remote transceiver for communicating the message, via the display transceiver, to the display screen, wherein the display screen is configured for displaying the message to persons proximate to the display unit, the control unit comprising one or more of a dedicated controller, paired exclusively with the display unit, and programming code selectively positionable on an electronic device and enabling the electronic device for emulating control functions of the control unit, the dedicated controller comprising:
  a remote housing defining an internal space, the remote transceiver being engaged to the remote housing and positioned in the internal space, the entry module comprising a remote screen engaged to a first surface of the remote housing, the remote screen being touch enabled and configured for presenting alphanumeric characters, wherein the remote screen is configured for entry of the message by selective touching of respective alphanumeric characters, and wherein the remote screen is configured for presenting the message, on a portion of the remote screen, prior to the remote transceiver communicating the message, via the display transceiver, to the display screen, the remote housing being rectangular box shaped,
  a remote microprocessor engaged to the remote housing and positioned in the internal space, the remote microprocessor being operationally engaged to the remote transceiver and the remote screen, and
  a remote battery engaged to the remote housing and positioned in the internal space, the remote battery being operationally engaged to the remote microprocessor for powering the remote microprocessor.

* * * * *